(12) United States Patent
Bhagath et al.

(10) Patent No.: US 12,068,041 B2
(45) Date of Patent: Aug. 20, 2024

(54) POWER REALLOCATION FOR MEMORY DEVICE

(71) Applicant: Western Digital Technologies, Inc., San Jose, CA (US)

(72) Inventors: Shrikar Bhagath, San Jose, CA (US); Dean Jenkins, La Canada-Flintridge, CA (US); Hedan Zhang, Santa Clara, CA (US); Bret Winkler, Mission Viejo, CA (US); Ning Ye, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 649 days.

(21) Appl. No.: 17/199,534

(22) Filed: Mar. 12, 2021

(65) Prior Publication Data

US 2022/0293195 A1 Sep. 15, 2022

(51) Int. Cl.
| | |
|---|---|
| *G11C 16/30* | (2006.01) |
| *G06F 30/367* | (2020.01) |
| *G06F 30/392* | (2020.01) |
| *G06F 30/398* | (2020.01) |
| *G06F 113/18* | (2020.01) |
| *G06F 119/02* | (2020.01) |
| *G06F 119/06* | (2020.01) |
| *G06F 119/08* | (2020.01) |
| *H01L 23/367* | (2006.01) |

(52) U.S. Cl.
CPC ............ *G11C 16/30* (2013.01); *G06F 30/367* (2020.01); *G06F 30/392* (2020.01); *G06F 30/398* (2020.01); *H01L 23/367* (2013.01); *G06F 2113/18* (2020.01); *G06F 2119/02* (2020.01); *G06F 2119/06* (2020.01); *G06F 2119/08* (2020.01)

(58) Field of Classification Search
CPC ....... G11C 16/30; G11C 16/0483; G11C 7/04; G11C 5/04; G06F 30/367; G06F 30/392; G06F 30/398; G06F 2113/18; G06F 2119/02; G06F 2119/06; G06F 2119/08; G06F 3/0625; G06F 3/0629; G06F 3/0679; H01L 23/367; H01L 23/42; G11B 33/144

See application file for complete search history.

(56) References Cited

U.S. PATENT DOCUMENTS

| | | | |
|---|---|---|---|
| 9,257,157 B2 | 2/2016 | Chu | |
| 10,181,351 B1 | 1/2019 | Jean | |
| 10,483,241 B1 * | 11/2019 | Duesman | ............ H01L 27/0288 |
| 2008/0101436 A1 | 5/2008 | Jung | |
| 2015/0089961 A1 | 4/2015 | Duzly et al. | |

* cited by examiner

*Primary Examiner* — Douglas W Owens
(74) *Attorney, Agent, or Firm* — Michael Best & Friedrich LLP

(57) ABSTRACT

A data storage device including, in one implementation, a number of memory die packages disposed on a substrate within the data storage device. Each memory die package has a die density that includes one or more memory dies. The die density of each memory die package is configured to provide an even thermal distribution across the number of memory die packages. The respective die densities of two memory of the die packages are different from each other.

7 Claims, 10 Drawing Sheets

POWER REALLOCATION FOR MEMORY DEVICE

BACKGROUND

This application relates generally to data storage devices, and more particularly, to allocating power to thermally level components within a memory device to improve memory device characteristics such as data retention and performance.

Generally, in data storage devices, and specifically commercial data storage devices such as Solid State Drives ("SSDs"), the temperature of the memory die (e.g. NAND die) is a critical parameter, such that performance of the memory device may be throttled to ensure that the memory die temperature does not exceed a predetermined threshold. Due to the number of memory dies in a given data storage device, the memory dies are typically evaluated as a single device with regards to temperature. Thus, the memory dies having the highest temperature determine the amount of throttling (e.g. the performance) applied to the data storage device as a whole. This approach can result in a loss of performance for the data storage device due to the hottest memory dies controlling the performance of the data storage device.

SUMMARY

Throttling performance of data storage devices based on the highest temperature components, such as memory dies, may result in the performance of the data storage device being unnecessarily reduced. Thermally leveling the components within the data storage device by reallocating power provided to certain components and/or placing higher power draw components in cooler portions of the data storage device may increase the performance of the data storage device.

One embodiment of the present disclosure is a data storage device. The data storage device includes a number of memory die packages disposed on at least one substrate within the data storage device. Each memory die package of the plurality of memory die packages has a die density that includes one or more memory dies. The die density of each memory die package is configured to provide an even thermal distribution across the number of memory die packages. The respective die densities of two memory die packages from the number of memory die packages are different from each other.

Another embodiment of the present disclosure is a method that includes performing, with an electronic processor, a thermal analysis of a memory device having an initial memory device design of a plurality of memory die packages. The method also includes performing a thermal leveling operation of the memory device. The method also includes updating the thermal analysis based on the thermal leveling operation and determining whether the thermal analysis that is updated meets a predetermined threshold. The method also includes generating a final memory device design in response to determining that the thermal analysis that is updated meets the predetermined threshold.

Another embodiment of the present disclosure is a non-transitory computer-readable medium which causes an electronic processor to perform a thermal analysis of a memory device including a number of memory die packages and perform a thermal leveling operation of the memory device. The non-transitory computer-readable medium further causes the electronic processor to update the thermal analysis based on the thermal leveling operation, determine whether the thermal analysis that is updated meets a predetermined threshold, and generate an updated memory device design in response to determining that the thermal analysis that is updated meets the predetermined threshold.

Various aspects of the present disclosure provide for improvements in data storage devices. For example, allocating power to thermally level components within the data storage device provides an increase in data performance. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. The following description is intended solely to give a general idea of various aspects of the present disclosure and does not limit the scope of the disclosure in any way. It also will be understood by those of skill in the art that the drawings are not to scale, where some features are exaggerated in order to highlight such features. Furthermore, it will be apparent to those of skill in the art that, although the present disclosure refers to NAND flash, the concepts discussed herein are applicable to other types of solid-state memory, such as NOR, PCM ("Phase Change Memory"), ReRAM, or other solid-state memory.

Figure 1:
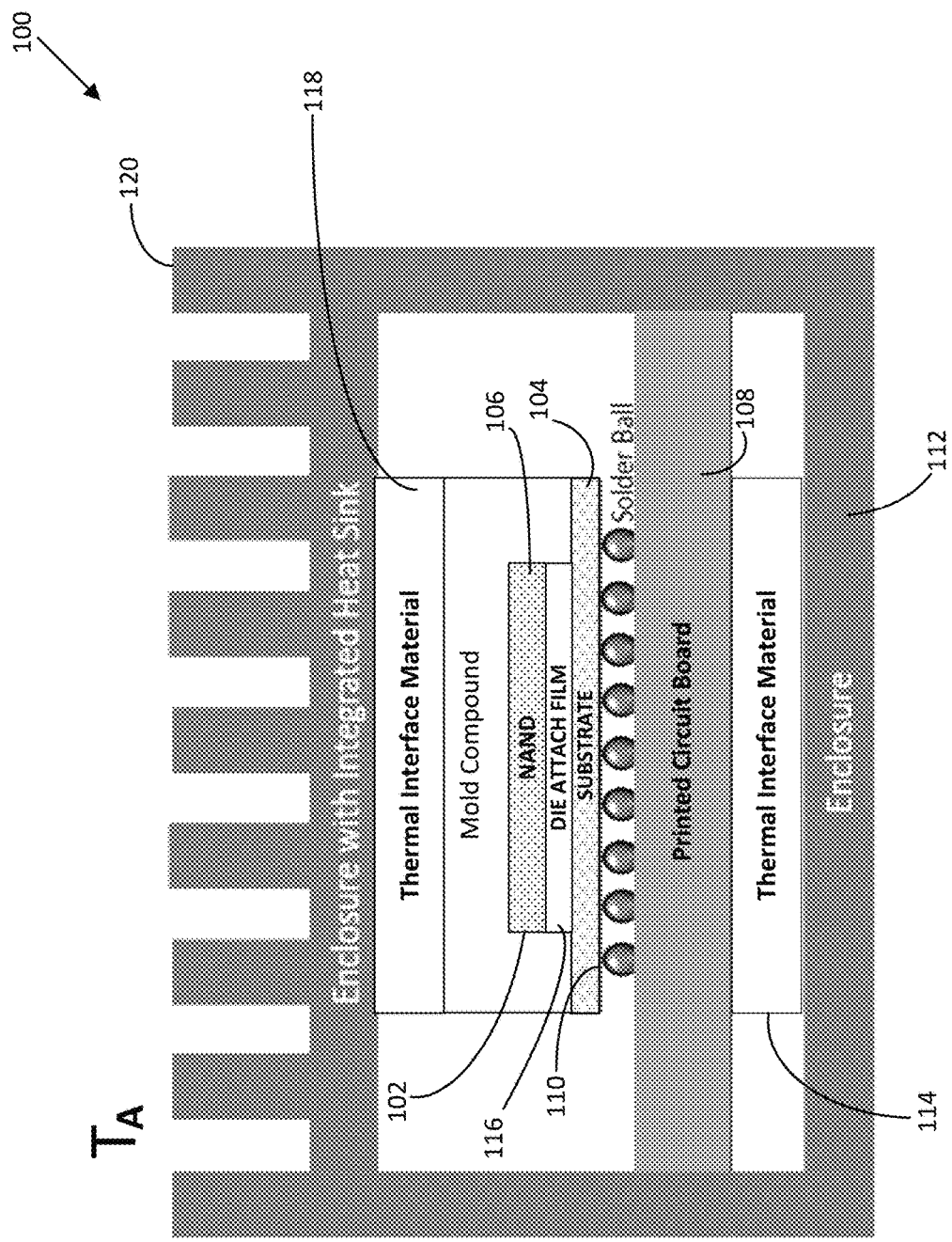
FIG. 1 is cross-sectional view of an exemplary memory device, according to some embodiments.

FIG. 1 is a block diagram of an exemplary NAND die package 100 having a memory die 102, such as a NAND memory die, attached to a substrate 104 via a die attach film 106. The memory die 102 may include one or more stacks of dies (e.g. NAND dies), such as four memory dies, eight memory dies, sixteen memory dies, and/or other quantities of memory dies as applicable to a given memory device or application. In the example of FIG. 1, the substrate 104 is attached to a printed circuit board ("PCB") 108 via a conductive coupling 110, such as solder balls or other soldered connections. The PCB 108 is then attached to an enclosure 112 with a thermal interface material ("TIM") 114. The TIM 114 may be a material configured to provide a low thermal resistance connection between the PCB 108 and the enclosure 112 to allow for heat from the PCB 108, and thereby the memory die 102, to be transferred to the enclosure 112 efficiently. The memory die 102 and die attach film 106 are covered with a mold compound 116, such as a thermoset plastic, epoxy resin (e.g., cresol novolac or biphenyl), silica filters, or other mold compounds as appropriate for an application. The mold compound 116 is also attached to the enclosure 112 with a die TIM 118. In one example, the die TIM 118 is similar in material and function to the PCB TIM 114 described above. However, in other examples the die TIM 118 is a different material than the PCB TIM 114. The enclosure 112 may include a heat sink 120 along one or more portions of the enclosure 112, such as the mold compound side of the NAND die 102. As will be described in more detail below, the heat sink 120 functions to transfer heat from the enclosure 112 to the surrounding air, having an ambient temperature $T_A$.

The memory device 100 of FIG. 1 is used only to show a configuration of a generic memory device and is not limited to the illustrated embodiment. It will be understood by those of skill in the art that memory devices may also include a control die and passive devices and the NAND die 102 may comprise one or more stacks of NAND dies that are connected to the substrate to provide a predetermined amount of memory capacity from, for example, 8 Gb to 1 Tb.

Figure 2:
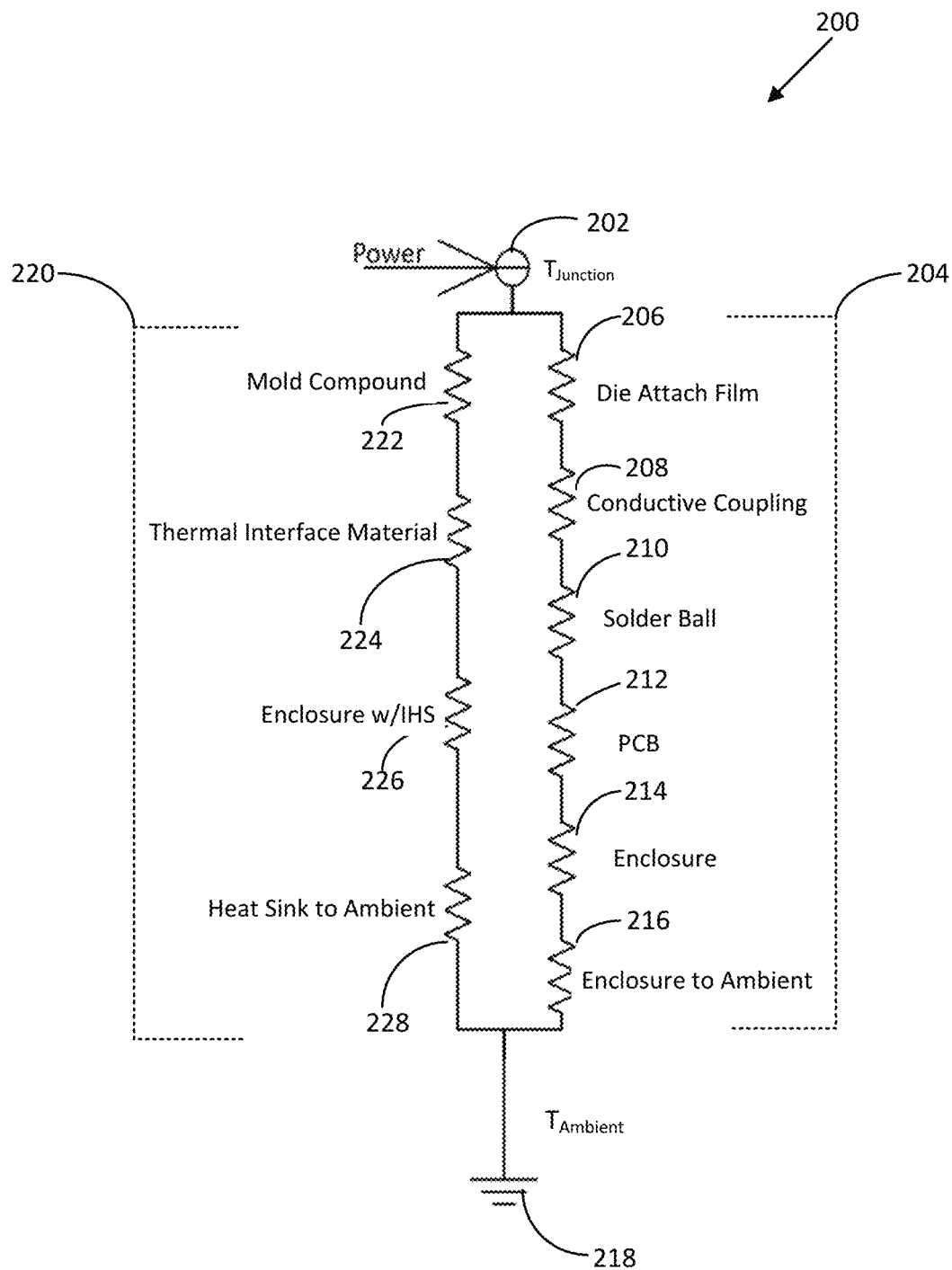
FIG. 2 is schematic illustrating a heat transfer circuit of the memory device of FIG. 1, according to some embodiments.

FIG. 2 illustrates a heat transfer circuit 200 of the memory device 100, and specifically a junction temperature $T_J$ 202 of the memory die 102, described above. As shown in FIG. 2, the heat transfer circuit 200 is expressed as a parallel resistive circuit. A first branch 204 of the parallel resistive circuit 200 represents the heat transfer from the memory die 102 to the surrounding air via the die attach film 106, the substrate 104, the conductive coupling 110, the PCB 108, the PCB thermal interface material 114 and the enclosure 112. Thus, the first branch 204 includes a die attach film thermal resistance 206, a substrate thermal resistance 208, a conductive coupling thermal resistance 210, a PCB resistance 212, an enclosure thermal resistance 214 and an enclosure to ambient thermal resistance 216. The thermal resistances 206, 208, 210, 212, 214, and 216 are coupled to a common point 218 representing an ambient temperature.

A second branch 220 of the parallel resistive circuit 200 represents the heat transfer from the $T_J$ 202 of the NAND die 102 to the surrounding air via the mold compound 116, the die thermal interface material 118, the enclosure 112 and the heat sink 120. As shown in FIG. 2, the second branch 220 includes a mold compound thermal resistance 222, a thermal interface material 224, an enclosure/heat sink thermal resistance 226, and a heat sink to ambient thermal resistance 228. The thermal resistances 206, 208, 210, 212, 214, and 216 are coupled to the common point 218 representing the ambient temperature.

As the heat transfer circuit 200 is a parallel circuit, the branch having the lowest thermal resistance will conduct the most heat from the $T_J$ 202 to the surrounding air (common point 218). Thus, if the second branch 220 has an overall lower thermal resistance, more heat will be conducted via the second branch 220 than the first branch 204. Similarly, if the first branch 204 has an overall lower thermal resistance than the second branch 220, more heat will be conducted via the first branch 204 than the second branch 220. Furthermore, due to the parallel configuration of the parallel resistive circuit 200 represents, reducing any one thermal resistance within a branch reduces the overall thermal resistance of the heat transfer circuit 200.

In some embodiments, the heat transfer efficiency of the memory device 100 may be improved by forcing air over the enclosure 112 or heat sink 120, such as via one or more fans. However, by utilizing one or more fans to improve heat transfer of the memory device 100, a power consumption of the memory device 100 may be increased, and increasing the flow of air by accelerating the rotational speed of the fans generally also requires more power to be applied to the fans. For large data centers, this additional required power may be significant, thus just adding fans or other forced air system to improve performance of the memory device 100 can result in undesirable power consumption for a given application.

Figure 3:
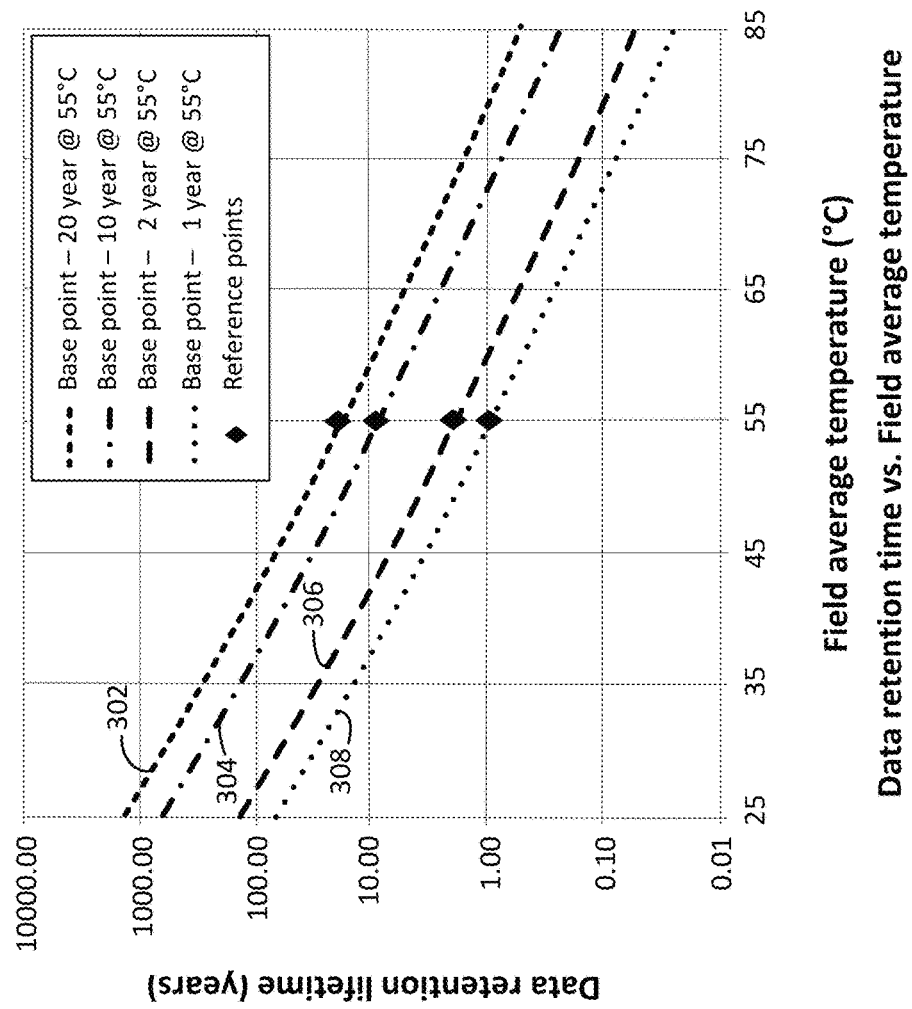
FIG. 3 is a graph illustrating data retention over time for a memory device, according to some embodiments.

Turning now to FIG. 3, a graph 300 showing data retention over time for a memory device, such as memory device 100 is shown according to some embodiments. The data lines represent a 20 year base line 302, a 10 year base line 304, a 2 year base line 306, and a 1 year base line 308 over a temperature range from 25° C. to 85° C. As can be seen in FIG. 3, as temperature increases, the data retention time (shown in years) decreases in a substantially linear manner for each of the 20 year base line 302, the 10 year base line 304, the 2 year base line 306, and the 1 year base line 308. Further, at temperatures over 55° C., the data retention time starts to fall below one year in duration. Thus, reducing temperatures of memory devices, and specifically the NAND dies therein, is critical for ensuring optimal data retention times.

Figure 4:
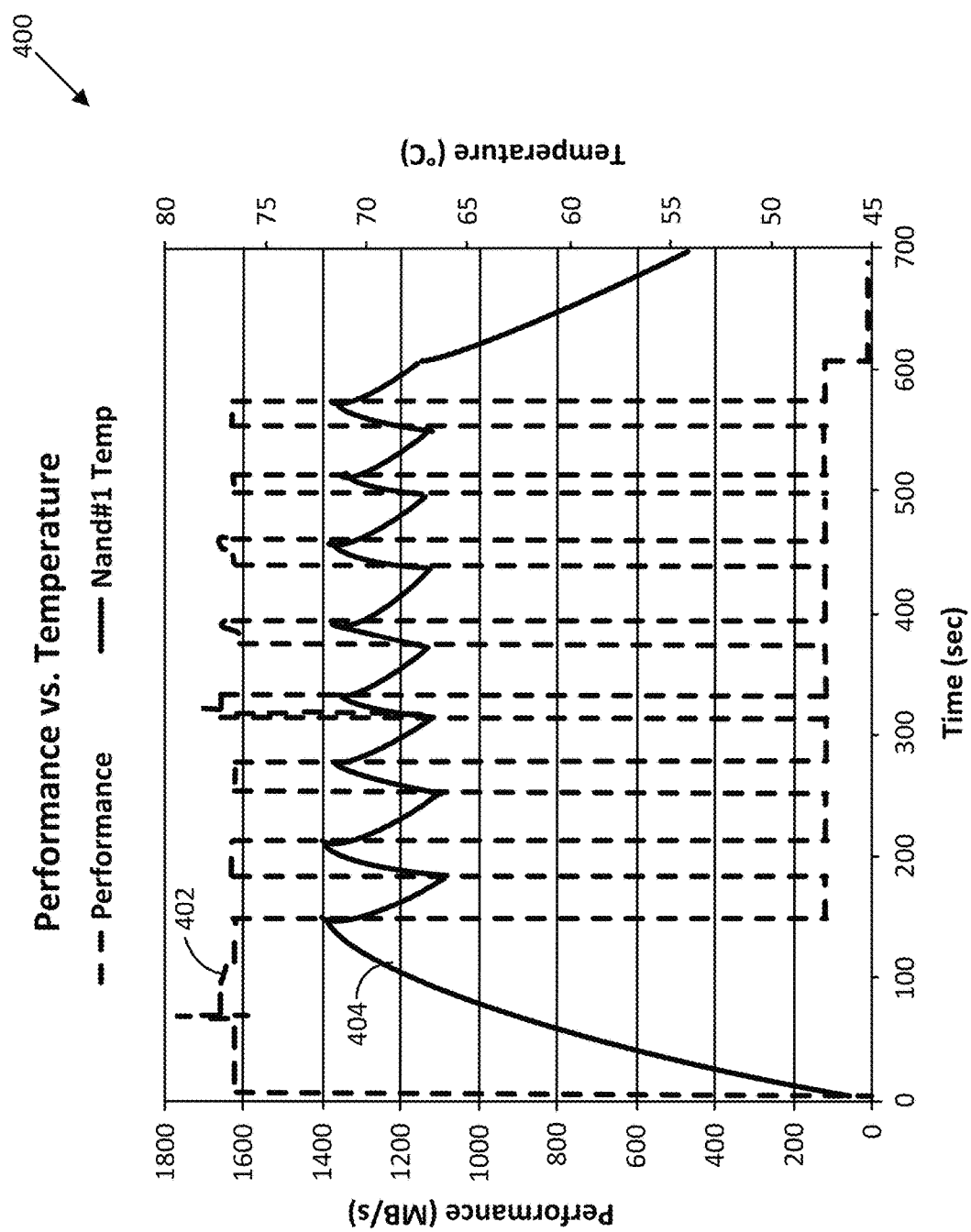
FIG. 4 is a graph illustrating memory device performance verses temperature, according to some embodiments.

FIG. 4 provides a graph 400 illustrating a NAND die performance 402 in response to changes in the NAND die temperature 404. As shown in FIG. 4, as the NAND die temperature 404 approaches a high temperature value (approximately 72.5° C.) the NAND die performance 402 is throttled substantially (approximately by 90%, or by about 1540 MB/s in the example of FIG. 4), until the temperature falls back to a lower temperature threshold (approximately 68° C.). Thus, it is clear that by better regulating the NAND die temperature 404, the large swings in the NAND die performance 402 can be reduced. In some examples, this is done by throttling NAND die performance 402 to prevent the NAND die temperature 404 from reaching the high temperature value. However, by thermally leveling the NAND dies, higher performance levels are obtained without increasing the NAND die temperature 404 beyond a high temperature value.

Figure 5:
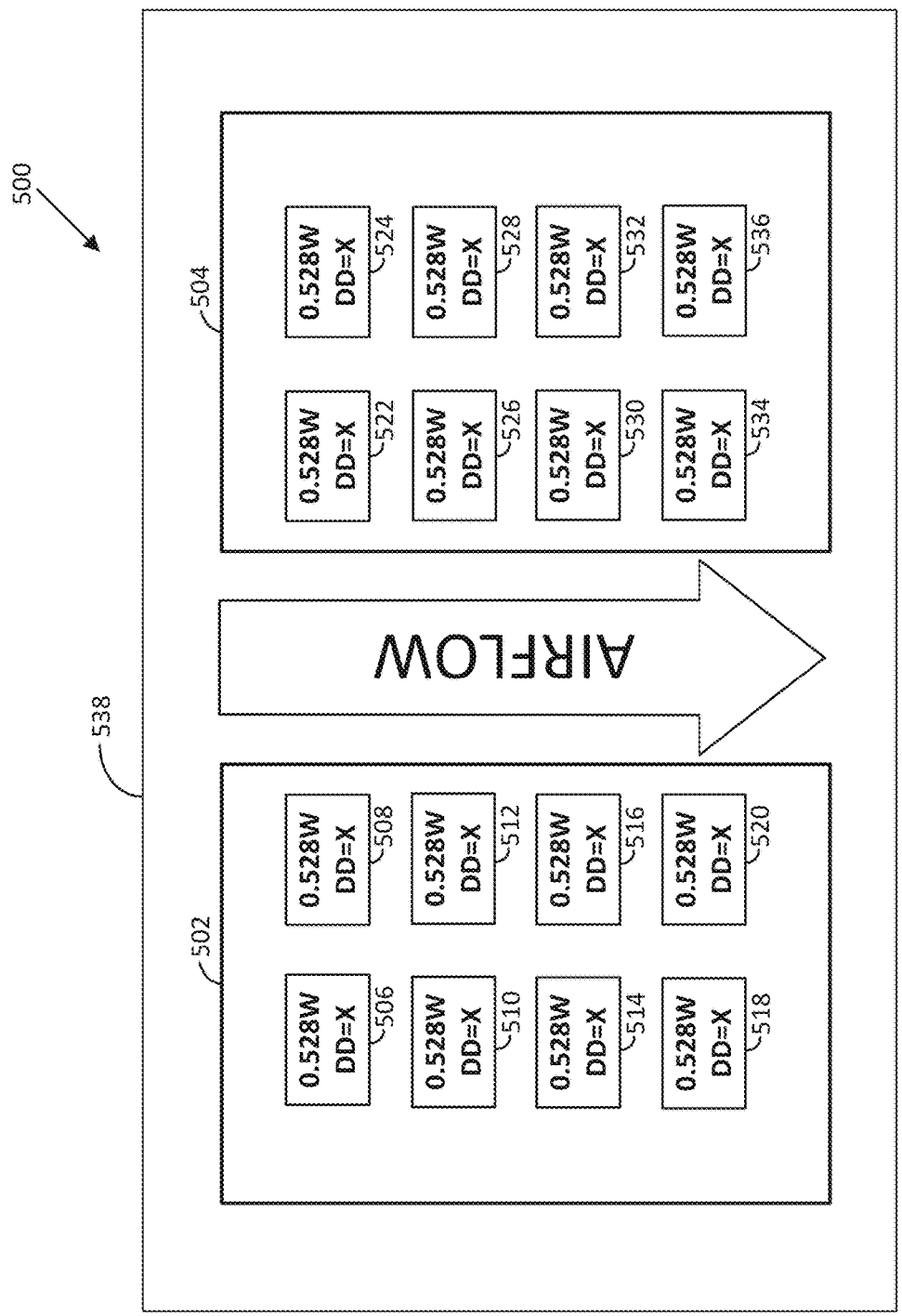
FIG. 5 is a block diagram illustrating a memory device, according to some embodiments.

Turning now to FIG. 5, a block diagram of a memory device 500 is shown, according to some embodiments. As shown in FIG. 5, the memory device 500 includes a first circuit board 502 and a second circuit board 504. The first circuit board 502 includes NAND die packages 506, 508, 510, 512, 514, 516, 518, 520 arranged as a 4×2 array. The second circuit board 504 includes NAND die packages 522, 524, 526, 528, 530, 532, 534, 536 also arranged as a 4×2 array. The first circuit board 502 and the second circuit board 504 may be located inside an enclosure 538. In some embodiments, the enclosure 538 may be a metallic enclosure such as aluminum, steel, or other thermally conductive material.

Figure 6:
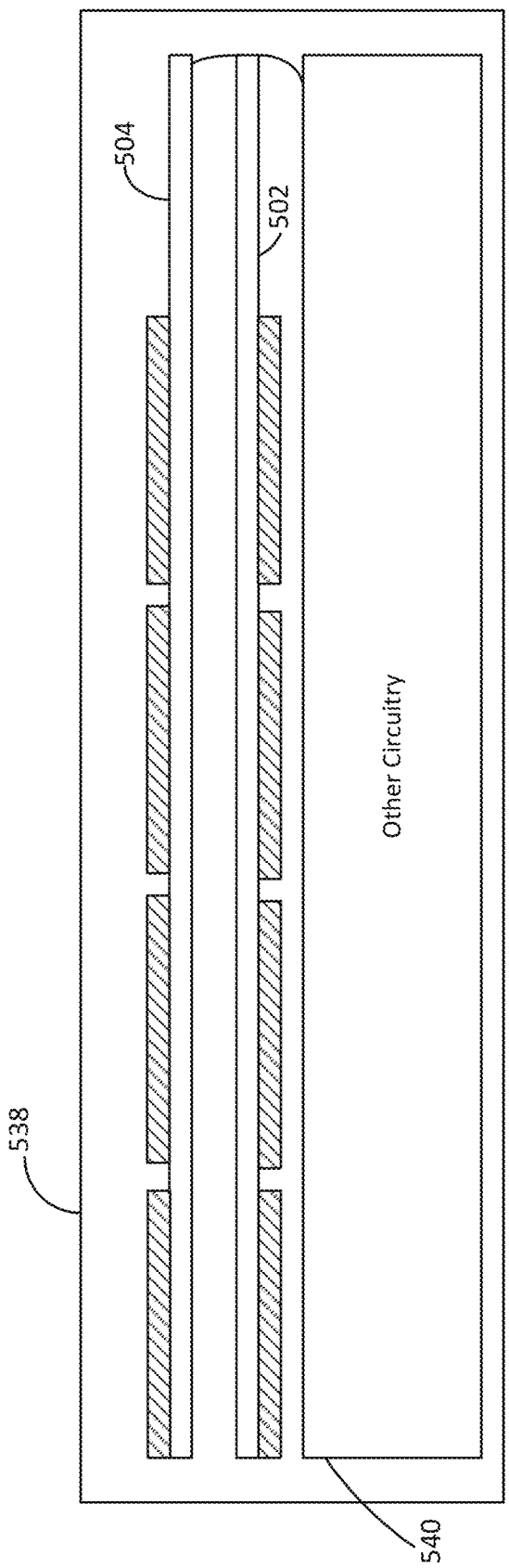
FIG. 6 is a side view of the memory device of FIG. 5, according to some embodiments.

In some embodiments, the first circuit board 502 and the second circuit board 504 may be positioned such that the sides of the first circuit board 502 and the second circuit board 504 that do not include NAND die packages (i.e., the back sides) are positioned next to each other. Turning briefly to FIG. 6, this configuration can be seen showing the orientation of the first circuit board 502 and the second circuit board 504. As also shown in FIG. 6, other circuitry 540 is also shown. The other circuitry 540 may include various components, such as a memory controller, a host interface, registers, power supplies, power regulation circuits, read/write circuitry, and other components or circuitry required for the operation of the memory device 500. In the embodiment shown in FIG. 6, the second circuit board 504 is positioned such that the NAND die packages 522-536 are facing the enclosure 538. In contrast, the first circuit board 502 is positioned such that NAND die packages 506-520 are facing the other circuitry 540. Thus, the NAND die packages 522-536 are closer to, and/or attached to, the enclosure 538 and generally will have better heat transfer characteristics than the NAND die packages 506-520. The memory device configurations and layouts described in regards to FIGS. 5 and 6 are used solely for exemplary purposes, and it is contemplated that the thermal leveling processes and applications described herein may be used with any memory device configurations.

Returning now to FIG. 5, equal power is applied to, and consumed by, each of the NAND die packages 506-536 in memory device 500. While the power shown in FIG. 5 is equal to 0.528 W, it is understood that various power levels may be applied as applicable to a given memory device or application. As each NAND die package 506-536 has the same power applied thereto, the temperature of the NAND die packages 506-536 are regulated based on the ability to dissipate and/or transfer the heat to the enclosure 538 and/or the ambient air. Additionally, each of the NAND die packages 506-536 have the same die density ("DD"), shown in FIG. 5 as a value of X. It is contemplated that the number of dies represented by X may be any number of dies (e.g. four, eight, sixteen) applicable for a given application or memory device.

Once the layout of NAND die packages and/or other components of a memory device, such as memory device 500, are known, a thermal analysis of the memory device is performed. In some examples, the thermal analysis is a simulated thermal analysis. For example, the thermal analysis may be performed using a simulation program such as, ANSYS Icepak, or FloTHERM. In other examples, the thermal analysis may be performed on a physical memory device, such as by using thermal imagers (e.g. IR imagers), multiple thermocouples, or other thermal analysis devices.

Figure 7:
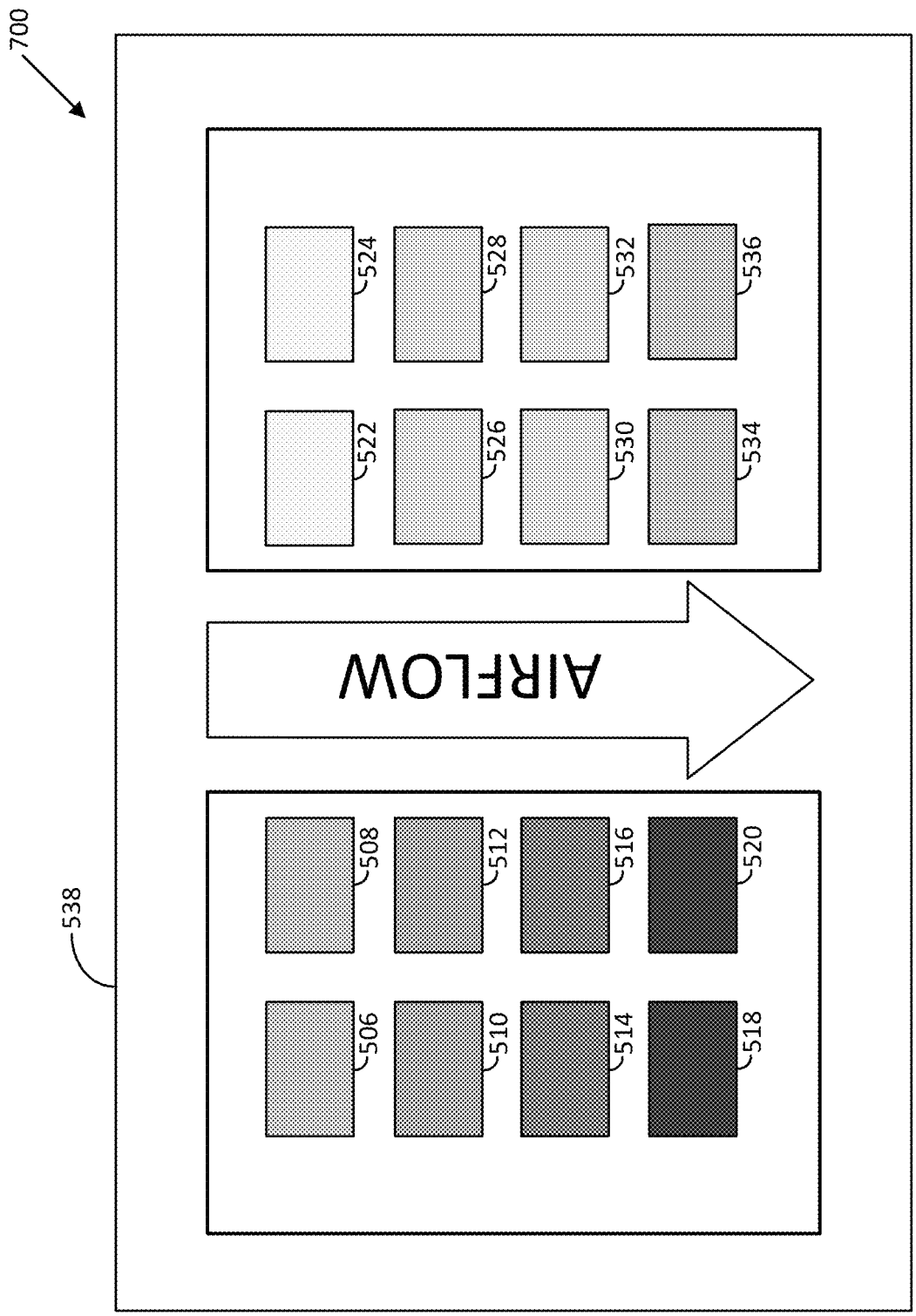
FIG. 7 is a block diagram illustrating a thermal analysis of the memory device of FIG. 5, according to some embodiments.

Turning now to FIG. 7, an example thermal analysis 700 for the NAND die packages 506-536 of the memory device 500 is shown, according to some embodiments. As shown in FIG. 7, the darker the shading, the higher the determined junction temperature ($T_J$) of the specific NAND die packages 506-536. Similarly, the lighter colored NAND die packages 506-536 have a cooler junction temperature than the darker colored NAND die packages 506-536. As shown in the thermal analysis 700, NAND die packages 522, 524 are the coolest, NAND die packages 526, 528, 530, 532 are warmer than NAND die packages 522, 524 but colder than NAND die packages 534, 536, 506, 508, 514, 516, 518, 520, NAND die packages 534, 536, 506, 508 are warmer than NAND die packages 522, 524, 526, 528, 530, 532 but colder than NAND die packages 514, 516, 518, 520, NAND die packages 514, 516 are warmer than NAND die packages 522, 524, 526, 528, 530, 532, 534, 536, 506, 508 but cooler than NAND die packages 518, 520, and NAND die packages 518, 520 are the hottest dies on the memory device 500. NAND die packages 522-536 are generally cooler than NAND die packages 506-520, as NAND die packages 522-536 are located closer to the enclosure 538, as shown in FIG. 6, thereby allowing for more heat to be transferred to the enclosure 538. In contrast, NAND die packages 506-520 are positioned such that the NAND die packages 506-520 are located farther away from the enclosure 538 making the heat transfer to the enclosure 538 less efficient.

Similarly, NAND die packages 506, 508, 510, 512, 522, 524, 526, 528 have a cooler average temperature than NAND die packages 514, 516, 518, 520, 530, 532, 534, 536. This may be due to the airflow 702 flowing first past the NAND die packages 506, 508, 510, 512, 522, 524, 526, 528, thereby becoming warmer before flowing past NAND die packages 514, 516, 518, 520, 530, 532, 534, 536, thereby reducing the heat transfer efficiency.

The temperature range for the NAND die packages 506-536 may be between 54.5° C. and 68.6° C. in one example. However, other temperature ranges are contemplated, and the exemplary range provided above is not to be construed as limiting. Further, the thermal analysis 700 is for exemplary purposes only, it is understood that different memory devices having different components, different component layouts, enclosure types and configurations, airflow characteristics, etc., will provide different thermal characteristics.

Based on a thermal analysis, such as thermal analysis 700, the memory device 500 may be thermally leveled by optimizing the power provided to each NAND die package 506-536 such that the overall power remains the same, or close to the same, but is redistributed between the NAND die packages 506-536 such that the packages in physically cooler locations are provided, and consume, more power than those in the physically warmer locations in the memory device 500. Power may be reallocated to the NAND die packages 506-536 in various ways. In one example, specific NAND die packages 506-536 are provided more power and are configured to be accessed more frequently and/or configured to increase the data transfer rate thereof to increase the power consumed by those NAND die packages 506-536. Similarly, NAND die packages 506-536 in warmer areas of the memory device are provided less power, accessed less frequently and/or configured to reduce the data transfer rate thereof to reduce the power consumption of those NAND die packages 506-536. However, changing the access rates and/or provided power to different NAND die packages 506-536 can result in the NAND die packages 506-536 with increased access frequency and/or increased data transfer rates experiencing increased wear resulting in shorter lifespans. For example, overuse of some NAND die packages 506-536 can result in increased bit-error rates, shorter data retention times, etc.

In another embodiment, the densities of the NAND die packages 506-536 are varied to reallocate the power consumed by the NAND die packages. For example, NAND die packages, such as NAND die packages 506-536, may have a number of individual NAND dies therein (typically stacked one atop another). Example NAND die packages may include 2 dies, 4 dies, 8 dies, and 16 dies. However, NAND die packages with more than 16 dies, or various numbers of dies between 1 and a maximum value are also contemplated. Generally, the denser the NAND die package (i.e. the greater the number of dies in a NAND die package), the more power that is consumed by the NAND die package. For example, a NAND die packages having 16 dies may consume approximately twice as much power as a NAND die packages having 8 dies. Thus, by placing NAND die packages 506-536 with higher die counts in cooler locations within a memory device more power is allocated to the cooler areas of the memory device. Similarly, by placing NAND die packages 506-536 with lower die counts in warmer locations within a memory device, less power is allocated to the cooler areas of the memory device, thereby aiding in preventing any one NAND die package from becoming too hot, such that performance of the memory device is reduced.

When increasing the number of dies in a NAND die package, additional channels may be provided to the higher density NAND die packages to ensure performance across the NAND die packages. For example, an 8-die NAND die package may have two data channels thereby allowing for one data channel to be available per 4 dies. However, a 16-die NAND die package having only two data channels would only have one data channel available per 8 dies. Thus, 16-die NAND packages may include four data channels to similarly have a data channel per 4 dies. It is contemplated that different numbers of data channels may be available for different NAND die packages, and the above example are illustrative only.

Figure 8:
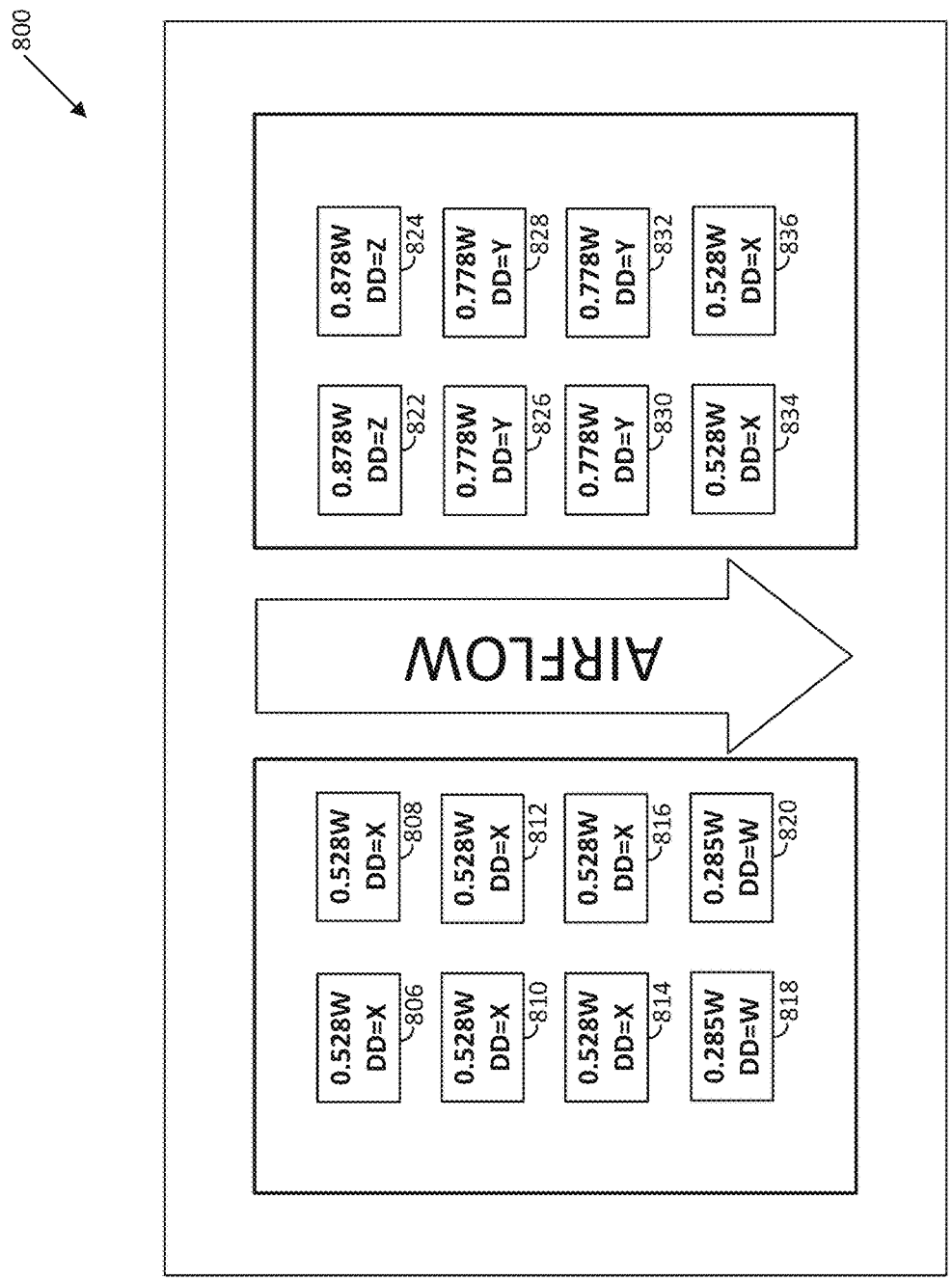
FIG. 8 is a block diagram illustrating a memory device after performing a power reallocation, according to some embodiments.

Turning now to FIG. 8, the memory device 500 after thermal levelling is performed is shown as memory device 800, according to some embodiments. As shown in FIG. 8, additional power has been reallocated to NAND die packages 822, 824, 826, 828, 830, and 832. The power has remained the same for NAND die packages 806, 808, 810, 812, 814, 816, 834, and 836, and the power to NAND die packages 818, 820 have been reduced. In the thermally leveled memory device 800 shown in FIG. 8, the total power is greater than the original memory device 500 configuration shown above. However, in some examples, the total power may be the same as a non-thermally leveled memory device. This increase in power may be based on the ability of the NAND die packages in the lower temperature areas to transfer heat to the enclosure or ambient air for a given memory device configuration or application.

As further shown in FIG. 8, the die densities of the respective die packages 806-836 are different for different die packages. The die density values of the die packages 806-836 are represented as values W, X, Y, and Z, wherein W, X, Y, and Z represent different die density values. For example, die packages 806, 808, 810, 812, 814, 816, 834, and 836 have X die densities, similarly to the die packages 506, 508, 510, 512, 514, 516, 534, and 536 described above in regards to FIG. 5. Die packages 818, 820 have a die density of W, which may be a lower die density than X, thereby resulting in less power being consumed by die packages 818 and 820. Conversely, die packages 826, 828, 830, 832 may have a die density of Y, which is a greater die density (e.g. more dies within die package) than die densities of X and W. Finally die packages 822, 824 may have a die density of Z, which is a greater die density than W, X, and Y. It is understood that the die densities expressed by W, X, Y, and Z may be any positive integer of die density values, such as four-die densities, eight-die densities, twelve die densities, sixteen die densities, and/or other die density values applicable for a given memory device or application.

Figure 9:
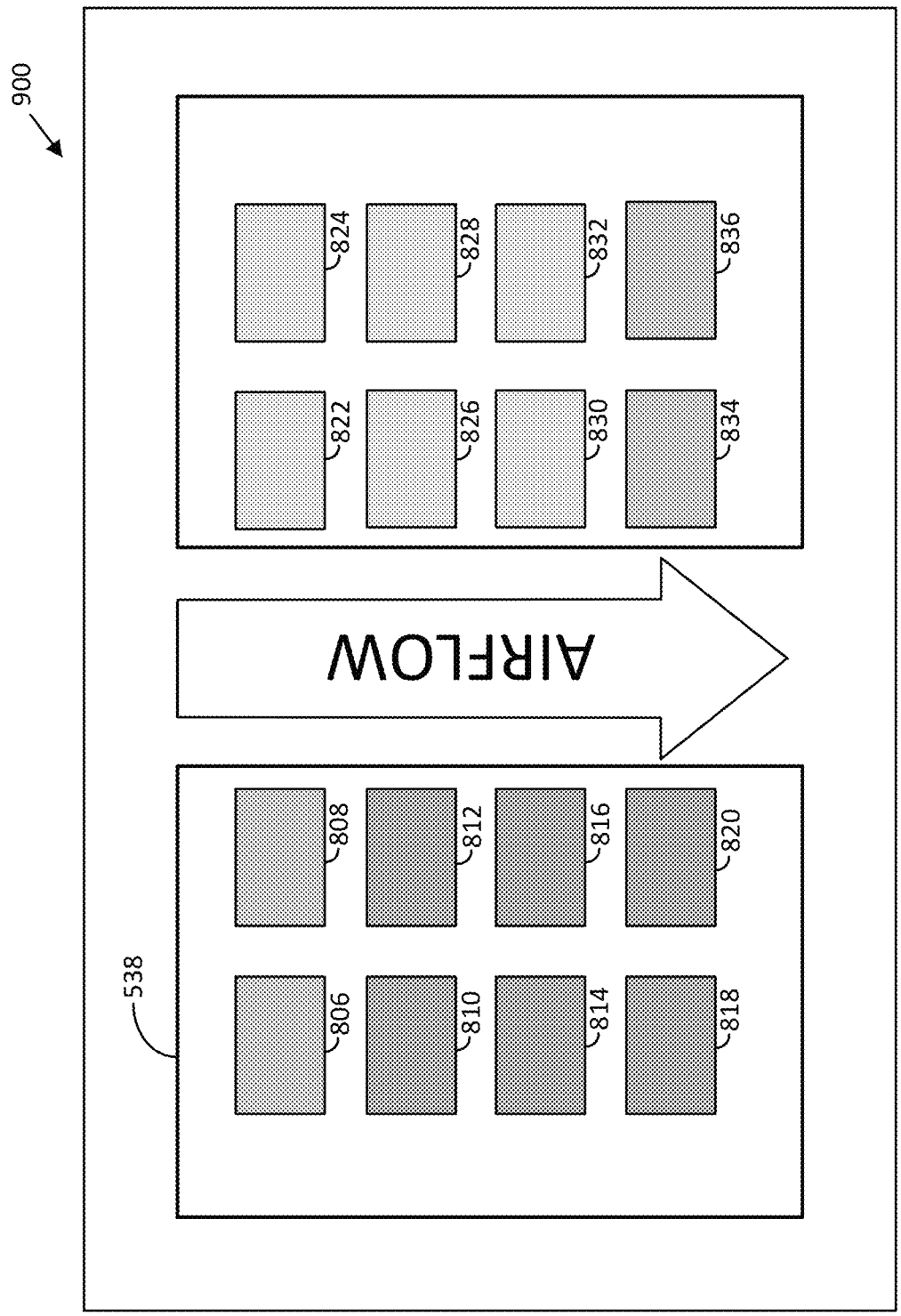
FIG. 9 is a block diagram illustrating a thermal analysis of the memory device of FIG. 5 after power reallocation has been performed, according to some embodiments.

Turning now to FIG. 9, a thermal analysis 900 of the memory device 800 having the power reallocation shown in FIG. 8 is shown, according to some embodiments. As shown in FIG. 9, the temperatures of the NAND die packages (806-836), again shown as varying degrees of darkness (darker color equating to higher temperatures), are more evenly distributed due to the reallocation of power. As noted above, the performance of a memory device, such as memory device 500, is generally limited based on the temperature of the hottest NAND die(s). Thus, by lowering the maximum temperature experienced by any of the NAND dies 806-836, the performance of the memory device 800 may be increased accordingly. Additionally, by thermally leveling the memory device 800, a fan associated with the memory device 800 may be able to run slower or, in some cases, be omitted, thereby potentially reducing the power requirements for the memory device 800. This can result in overall power reductions for large installations, such as server farms, memory banks, etc. In one example, the memory device power requirements may be reduced by 3-5%. However, reductions of power by more than 5% is also contemplated.

While the thermal analysis 900 above is a first iteration of the thermal leveling performed on the memory device 800, it is contemplated that multiple iterations may be performed to determine the optimal thermal leveling configuration. As will be described in more detail below, one or more computer programs, algorithms, machine learning algorithms, artificial intelligence ("AI") program, or other computer implemented system may be used to perform the above thermal analysis and leveling. For example, resistance thermal network models in conjunction with computational fluid dynamics simulation software (for example, ANSYS Icepak, or similar software) may be used to perform the thermal analysis described herein. Furthermore, one or more parameters or thresholds may be used to optimize the thermal leveling. For example, performing thermally leveling with a goal of maximizing data retention time may produce different results than thermally leveling with a goal of maximizing performance (e.g. increased data throughput). For example, where the goal is maximizing data retention, reducing a maximum temperature of any given NAND die package may be given priority. In contrast, where the goal is maximizing performance, maximizing power to NAND die packages without overheating any particular NAND die package may be given priority. In some examples, performance goals may be a percentage increase, such as a 10% increase in performance. However, increases of more than 10% or less than 10% are also contemplated. Other combinations of performance and durability are contemplated such that the thermal leveling can be optimally performed.

Figure 10:
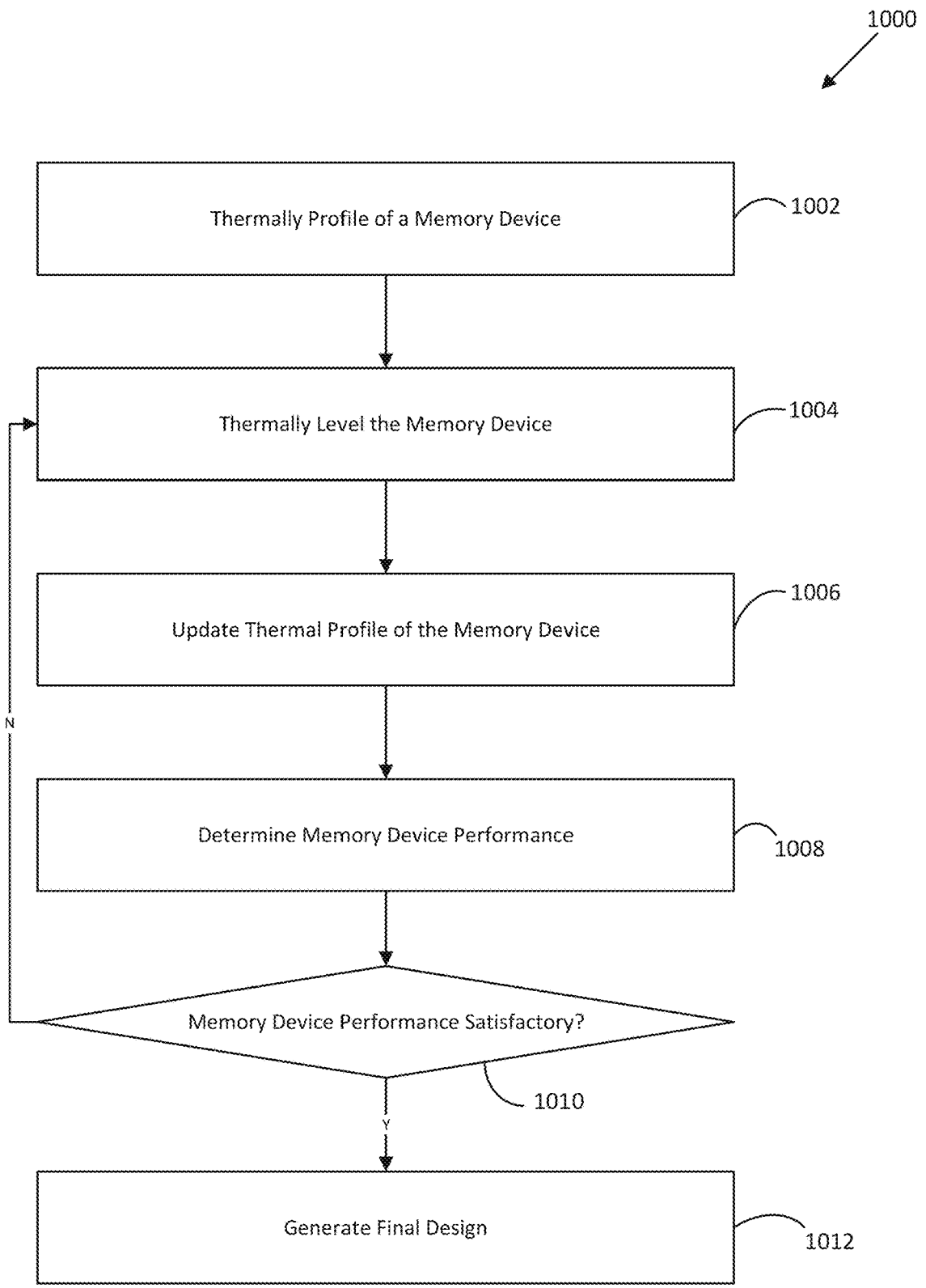
FIG. 10 is a flow chart illustrating a process for thermally leveling a memory device, according to some embodiments.

Turning now to FIG. 10, a process 1000 for performing thermal leveling on a memory device, such as memory device 500, is described according to some embodiments. In some embodiments, the process 1000 may be performed by a computer using various programs or algorithms to perform the analysis, such as those described above. In some examples, a dedicated computing system may be used to perform the process 1000. Any reference to a "computer" is understood to mean a computer, algorithm, processor, controller, or any other device or program configured to execute a series of instructions.

The process 1000 is described in regards to the memory device 500 described above. However, it is understood that the process 1000 may be applied to any memory device, such as solid-state drives, flash memory devices, consumer memory devices, etc.

At block 1002, a thermal profile is generated for the memory device 500. As described above, the thermal profile may be generated using one or more thermal simulation programs. In other examples, the thermal profile may be generated based on a number of temperature measurements taken of a physical memory device. The thermal profile may analyze certain components within the memory device 500, such as the NAND die packages 506-536. However, it is contemplated that all of the components of the memory device 500 are thermally analyzed during the generation of the thermal profile.

At process block 1004, the NAND die packages are thermally leveled based on the generated thermal profile. As noted above, the NAND die packages 506-536 may be thermally leveled based on one or more predetermined thresholds or other parameters, such as maximization of performance (e.g. data throughput), maximization of durability, a performance and durability balance, a targeted power consumption value, etc. In some examples, the NAND die packages are thermally leveled such that the average temperature NAND die package temperature is below a predetermined value. For example, the memory device 500 may be thermally leveled such that the average junction temperature of the NAND die packages is below 55° C. However, average junction temperatures of more than 55° C. and less than 55° C. are also contemplated. In other examples, the memory device 500 may be thermally leveled such that the junction temperature of any individual NAND die package does not exceed a predetermined value. For example, the memory device 500 may be thermally leveled such that the junction temperature of every NAND die package does not exceed 55° C. However, temperatures of more than 55° C. and less than 55° C. are also contemplated. The above examples are for illustrative purposes, and the thermal leveling may be performed to achieve any other goal, as applicable.

As described above, thermally leveling may alter the power consumed by, or provided to, the individual NAND die packages 506-536. For example, the performance of the NAND die packages may be altered such that NAND dies packages in hotter locations are throttled down (e.g. reduced data throughput), while NAND die packages in cooler locations are throttled up (e.g. increased data throughput). In another embodiment, the density of the NAND dies within the NAND die packages may be varied to achieve the desired thermal leveling as described above. For example, the NAND die density is increased for NAND die packages in cooler locations within the memory device 500, and the NAND die density is decreased for NAND die packages in hotter locations within the memory device 500.

In response to the thermal leveling being completed, the thermal profile of the memory device 500 is updated at block 1006. In one embodiment, the thermal profile performed in block 1002 is performed again with the thermally leveled configuration determined in block 1004.

At block 1008, the memory device 500 performance is determined. In one embodiment, the memory device 500 performance is determined based on the updated thermal profile. In other embodiments, the memory device 500 performance is determined based on the updated thermal profile and the thermally leveled configuration. For example, the performance may be determined based on the temperatures determined in the updated thermal profile, such as where the junction temperature of the dies is a goal. In other examples, where the goal is related to power consumption or NAND die package performance (e.g. data throughput), the performance may be determined based on the NAND die package performance or power consumption for the thermally leveled memory device. In still other examples, a combination of junction temperature, power consumption, and NAND die package performance may all be determined. In some examples, other factors, such as fan power requirements, data storage capacity, etc., may also be used to determine the performance of the memory device 500.

A determination of whether the memory device 500 performance is satisfactory is performed at block 1010. The performance may be determined to be satisfactory where the memory device 500 performance meets or exceeds one or more thresholds, such as those described above. In other examples, the performance may be determined to be satisfactory where the average and/or individual NAND die package junction temperatures are below a predetermined threshold. In still further examples, the performance may be determined to be satisfactory where the NAND die package junction temperatures are evenly distributed between all or a predefined portion of NAND die packages. The temperatures between the NAND die packages may be determined to be evenly distributed when the junction temperatures are within ±5% of each other. However, even distribution values of more than 5% or less than 5% are also contemplated.

Other performance thresholds or targets may also be used to determine whether the memory device 500 performance is satisfactory. In response to determining that the performance is not satisfactory, the memory device 500 is again thermally leveled at block 1004. In response to determining that the performance is satisfactory, a final design of the memory device 500 is generated at block 1012 based on the thermally leveled configuration determined at block 1004. In some embodiments, the final design includes the reallocated power to the NAND die packages. For example, the final design may include a distribution of NAND die densities for the NAND die packages determined during the thermal leveling operation performed at block 1004.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device, comprising:
    a substrate; and
    a plurality of memory die packages disposed on the substrate, wherein each memory die package has a die density that includes one or more memory dies;
    wherein the die densities of the memory die packages are configured to provide an even thermal distribution across the plurality of memory die packages, and
    wherein respective die densities of two memory die packages from the plurality of memory die packages are different from each other.

2. The data storage device of claim 1, wherein a first die density of a first memory die package from the two memory die packages is greater than a second die density of a second memory die package from the two memory die packages.

3. The data storage device of claim 2, wherein the first memory die package is positioned in a first area of the data storage device and the second memory die package is positioned in a second area of the data storage device.

4. The data storage device of claim 3, wherein the first area is determined to be a lower temperature area than the second area based on a thermal analysis of the data storage device.

5. The data storage device of claim 2, wherein the first die density of the first memory die package from the two memory die packages includes 16 memory dies.

6. The data storage device of claim 2, wherein the second die density of the second memory die package from the two memory die packages includes 8 memory dies.

7. The data storage device of claim 1, wherein the even thermal distribution is an average junction temperature for all of the plurality of memory die packages below a predetermined threshold.

* * * * *